United States Patent
Brault

(10) Patent No.: US 9,834,279 B2
(45) Date of Patent: Dec. 5, 2017

(54) POWER-AUTOMATED TRACTION FOR SNOWMOBILE SKIS

(71) Applicant: Jean Brault, Cowansville (CA)

(72) Inventor: Jean Brault, Cowansville (CA)

( * ) Notice: Subject to any disclaimer, the term of this patent is extended or adjusted under 35 U.S.C. 154(b) by 0 days.

(21) Appl. No.: 15/530,707

(22) Filed: Feb. 21, 2017

(65) Prior Publication Data

US 2017/0225744 A1    Aug. 10, 2017

Related U.S. Application Data

(63) Continuation-in-part of application No. 14/998,718, filed on Feb. 8, 2016, now Pat. No. 9,643,075.

(51) Int. Cl.
*B62M 27/02* (2006.01)
*B62B 17/02* (2006.01)
*B62B 17/08* (2006.01)

(52) U.S. Cl.
CPC ............. *B62M 27/02* (2013.01); *B62B 17/02* (2013.01); *B62B 17/08* (2013.01); *B62M 2027/025* (2013.01)

(58) Field of Classification Search
CPC ..... A63C 7/1073; A63C 7/108; A63C 7/1086; A63C 7/1093; A63C 7/12; A63C 7/005; B62M 27/02; B62M 2027/025; B62B 17/02; B62B 17/08

USPC ............ 280/604, 605, 606, 607, 809, 28.11; 188/5, 8, 32

See application file for complete search history.

(56) References Cited

U.S. PATENT DOCUMENTS

| | | | |
|---|---|---|---|
| 6,308,966 B1* | 10/2001 | Cook | B60T 1/14 180/183 |
| 7,255,195 B2* | 8/2007 | Haruna | B62M 27/02 180/209 |
| 9,545,976 B2* | 1/2017 | Melcher | B62M 27/02 |

OTHER PUBLICATIONS

Naseem Daher, Chuang Wang, and Monnika Ivantysynova, Novel Energy-Saving Steer-by Wire System for Articulated Steering Vehicales: Study, Jun. 3-5, 2013 Indiana USA.

* cited by examiner

Primary Examiner — John D Walters

(57) ABSTRACT

Traction systems for snowmobile skis producing traction on snow and ice covered surfaces; consisting a pair of snowmobile skis each having an assembly of parts; driven by an hydraulic rotor that pivots the skis, adjusting their position when cornering, providing traction, according to a snowmobile steering system. And is powered and controlled by at least one of: hydraulic steering system, an electro-hydraulic steering system; an electric power steering system using an electric motor instead of hydraulic rotor.

5 Claims, 3 Drawing Sheets

POWER-AUTOMATED TRACTION FOR SNOWMOBILE SKIS

This is a Continuation in part of, U.S. application Ser. No: 14/998,718 Dated: Feb. 8, 2016

BACKGROUND OF THE INVENTION

1. Field of the Invention

The present invention relates to a system that provides automated traction for snowmobile skis on ice and snow covered surfaces.

2. Description of the Related Art

Power steering technologies are evolving rapidly. Wherein electric power steering systems are pressing to compete with hydraulic power steering systems is one example.

A combination of electro-hydraulic systems are also evolving; one such example is described in: " the 13th Scandinavian International Conference on Fluid Power, SICFP2013, Jun. 3-5, 2013,Linkoping, Sweden (NOVEL ENERGY-SAVING-STEER-BY-WIRE SYSTEM FOR ARTICULATED STEERING VEHICLES: A COMPACT WHEEL LOADER CASE STUDY), Naseem Daher, Chuang Wang, and Monika Ivantysynova. School of Mechanical engineering, Purdue University, West Lafayette, Ind., USA."

And included here as reference.

Snowmobiles have benefited greatly from new technologies in recent years; yet traction remains a problem, when turning a snowmobile especially on hard packed snow, and ice surface conditions. The problem amplifies for example: when the snowmobile takes on higher speeds. Snowmobile skis tend to sheer in these conditions; or if turning a sharp curve. Here again speed is a factor.

Or when turning in a slanted position on a slope. Some remedy for these problems is for the snowmobile driver to lean into the curve. What is needed is a Snowmobile more suitably adapted to cut a curve (follow a curved trajectory line) and maintain more consistency with an inbounds center of gravity; then would a conventional snowmobile directional system. The stability of the snowmobile would also improve with the present embodiment since both skis of a snowmobile are leaning into the curve helping to keep the center of gravity from shifting all its pressure to the outward ski, causing an improved equilibrium of gravity between both skis. And therefore greater traction. This is a major improvement over conventional snowmobile directional systems that cannot rotate the skis at an angle to meet a curved trajectory line contrary to the present embodiment that can.

SUMMARY OF THE INVENTION

The present invention relates to traction means; that are provided for a pair of snowmobile skis; for gaining traction on snow and ice covered surfaces.

In one aspect, a pair of snowmobile skis using oil hydraulic rotary actuators or electric motors to operate a snowmobile skis traction apparatus; that is one apparatus for each ski; that are connected and controlled by the power steering system, of a snowmobile. The pair of skis pivot around a drive shaft that brings the skis to an angle, when turning; producing the traction. In an other aspect ,the apparatus can adapt to an electro-hydraulic steering system. Or an electric power steering system; by using the electric motor; as part of the apparatus instead of the hydraulic rotary actuator.

DETAIL DESCRIPTION OF THE INVENTION

The present invention is described with reference to the drawings.

Figure 2:
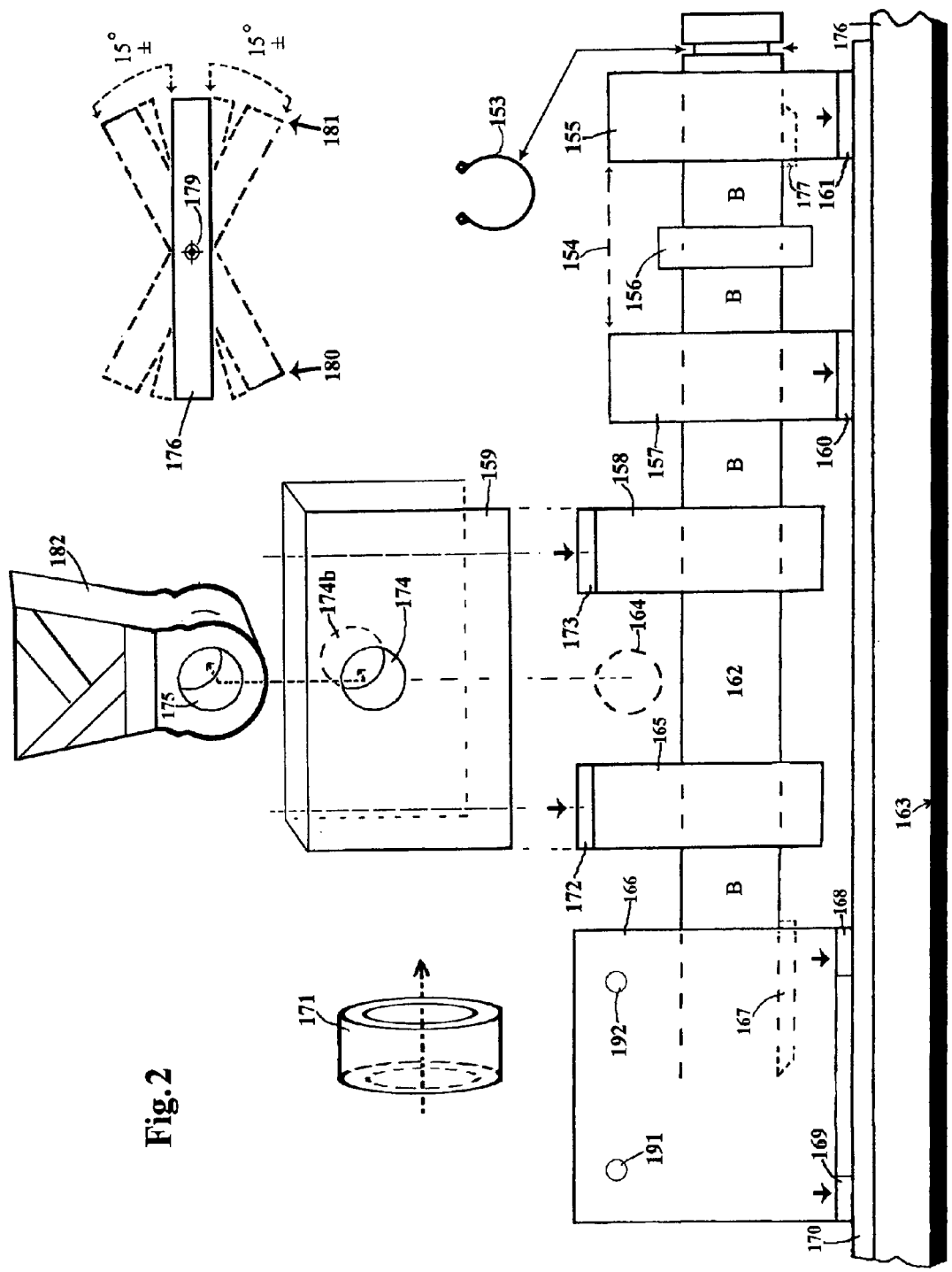
FIG. 2 shows an exploded cross-sectional partially fractured view of snowmobile ski 176, mounted with a traction apparatus for engaging a snowmobile connecting member 182; a diagram (top right) of ski movements.

To provide a certain order and steps, and help the viewer save time and have a clear understanding; FIG. 2, is explained alongside to FIG. 3.

Figure 1:
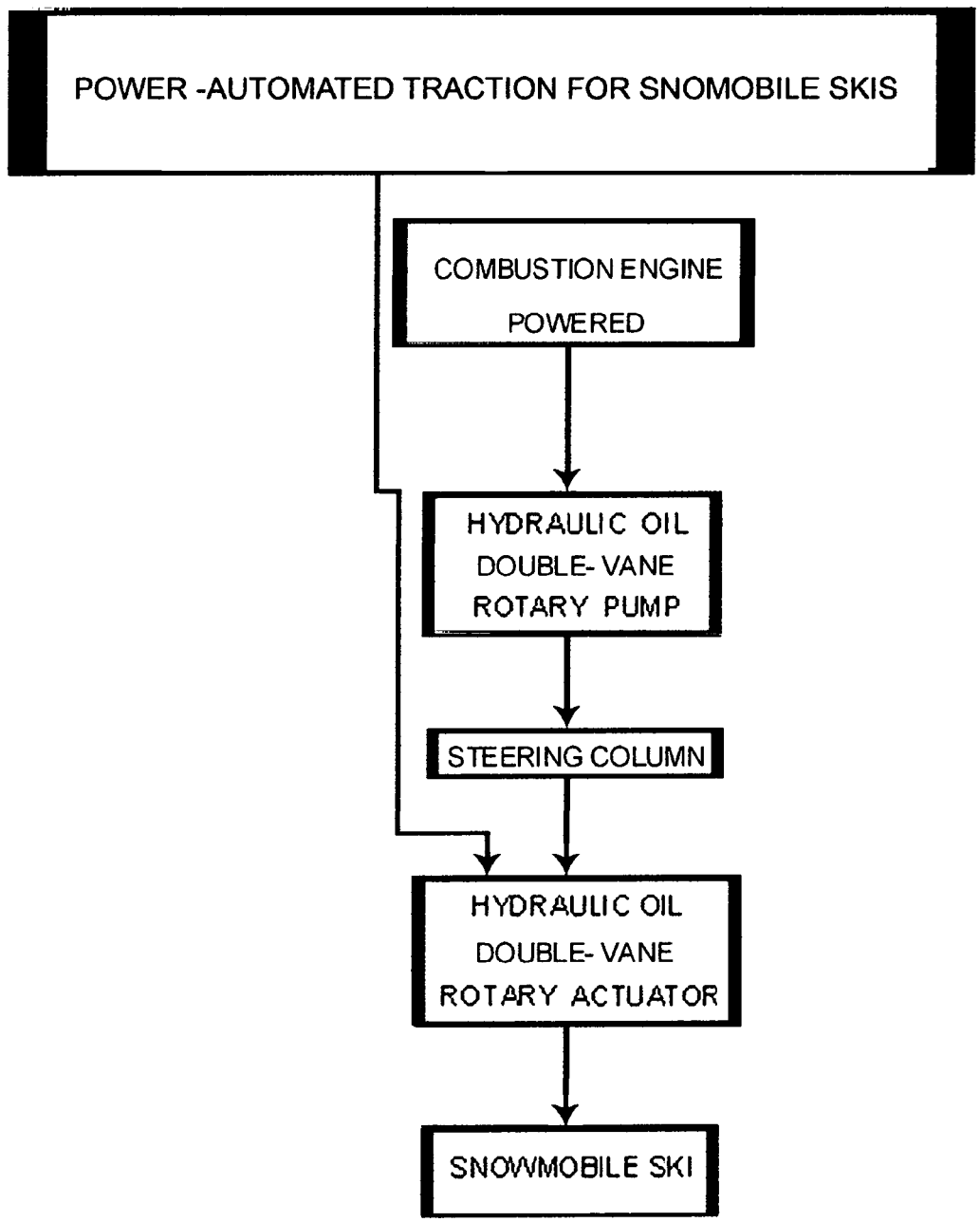
FIG. 1 is a block diagram containing writing describing a traction system for a snowmobile ski.

FIG. 1, shows a rectangle box containing the title of the invention linked to the vertical column of inter-connected boxes (via arrows).

The column of inter-connected boxes describes the basic components needed to provide power automated traction for snowmobile skis, that allows a pair of snowmobile skis to run parallel with a curved trajectory line when turning (cornering) as they pivot accordingly with the position of a handlebars steering shaft of a snowmobile; to provide the skis greater traction on snow and ice surfaces (terrain).

Figure 3:
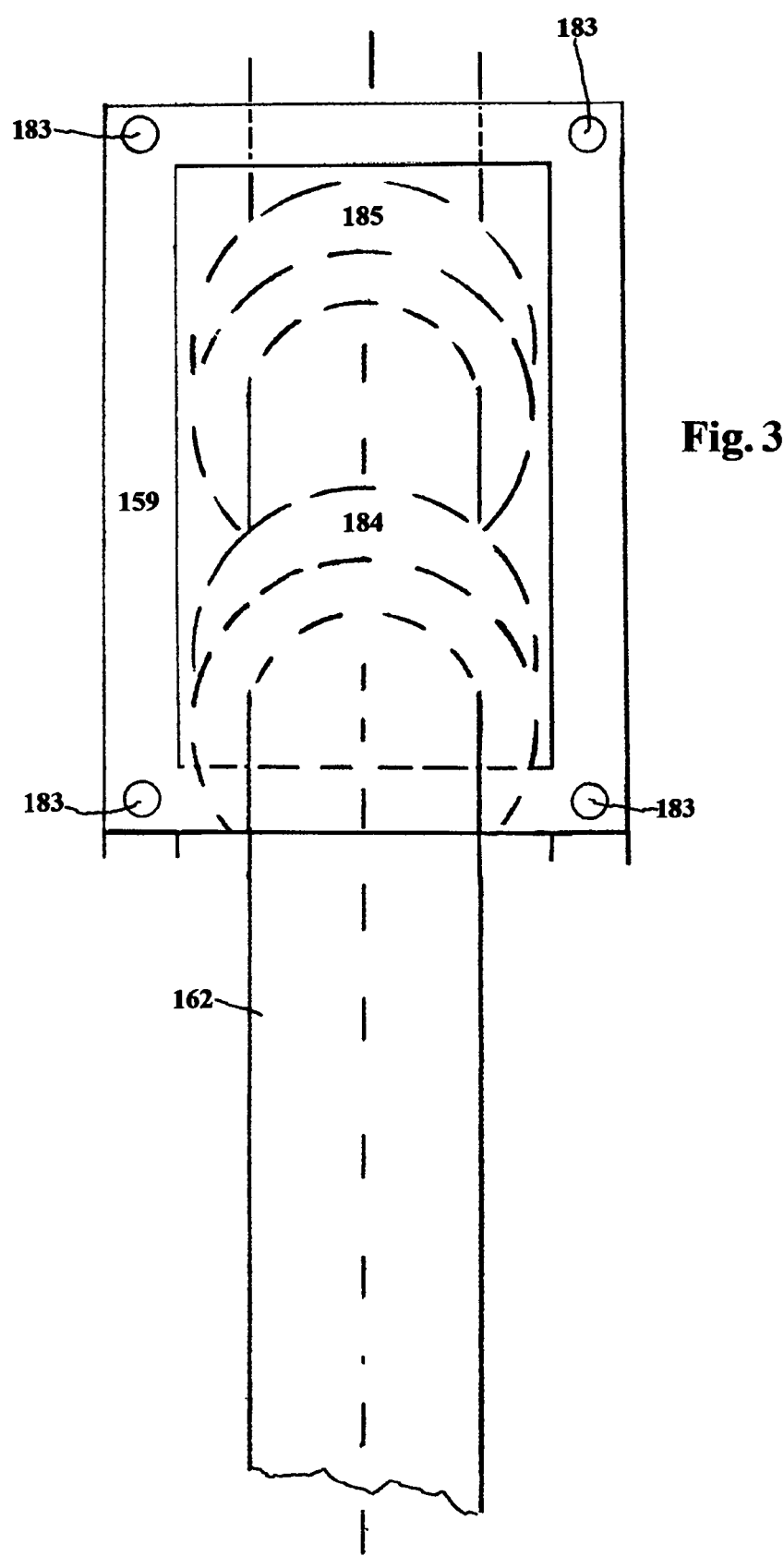
FIG. 3 shows an above view of a cover 159, and to 159 (FIG. 2), for engaging the traction apparatus to (FIG. 2); and other related parts with the snowmobile connecting member 182 to (FIG. 2).

More specific details described to FIG. 1 are to be found in FIG. 2; FIG. 3.

FIG. 2, shows a traction apparatus mounted on a snowmobile ski 176; wherein a fractured view of ski 176 (at each end of 176) is shown; and further showing a snowmobile attachment part 182. Each traction apparatus of a pair; are each mounted on a separate snowmobile ski of a snowmobile (snowmobile not shown). To provide a lucid understanding to the viewer; only one traction apparatus mounted on one ski 176, are shown. However the pairs of snowmobile skis each mounted with a traction apparatus will be explained together where it becomes obvious that the pairs are needed to proceed.

The snowmobile attachment part 182; and a snowmobile, snowmobile engine, steering column, rotary vane pump, electro-hydraulic pump system, electronic power steering system are used only as reference to the present embodiment. However ski 176 to FIG. 2, and all that pertains to FIG. 2, and (FIG. 3) is part of the present embodiment. Excluding as mentioned, attachment part 182 FIG. 2.

Using bolts, fitted with lock washers(not shown); an Hydraulic double-vane rotary actuator 166, is fixed via holes indicated by an arrows via flange mounting parts 169, and 168 to a sturdy metal plate 170, that is between (5 millimeters and 10 millimeters thick; wherein said bolts fitted with washers engage said holes, then metal plate 170 via threaded hole immediately under said 169 and 168; that is two threaded holes facing the viewer to FIG. 2, and two other threaded holes at the back: opposite side (not shown).

Said Hydraulic double-vane rotary actuator 166, engages one end of a metal drive shaft 162. Both 166 and 162 are partially keyed (having a keyway) NOTE: (Shaft 162 is partially keyed near the opposite end as well; that is explained further on). Key 167 is inserted inside the keyway (showing a transparent view of key 167 inserted into 166); interlocking 166 and 162 together. A polyurethane spacer 171, is fitted onto drive shaft 162 and is positioned in between 166 and 165 indicated by the letter (B) on drive shaft 162 (other spacers 171 are to be found along 162 indicated also with the letter (B). Said spacer 171 is also known as a recessed bumper, and are used for protecting parts from impact with one and other (and are known to the art). Following 171, are two equal sized square pillow block bearings 165 and 158 (pillow block bearing are known to the art). Leaving a space in between 165 and 158; that are both mounted with metal cover 159; wherein said cover 159 engages snowmobile attachment part 182, via hole 174, and 174b (of said cover 159) with hole 175 of snowmobile attachment part 182. Said 182 enters the cover 159, via an opening (that is visible) above cover 159 to (FIG. 3), in between 184 (FIG. 3) and 185 (FIG. 3) above the drive shaft 162 (FIG. 3). Holes 174 and 174b and 175 mach perfectly aligned to become (form) one hole 164; herein a metal supporting shaft threaded at both ends (this supporting shaft is not shown) engages hole 164 crossing from side to side, wherein the threaded ends of said supporting shaft overlap on each sides of cover 159. Said supporting shaft is fitted at both ends with plastic washers (not shown), followed by, flange-slotted-threaded nuts (not shown) one for each sides. Two cotter pins, one for each said flange-slotted-threaded nuts, that enters the slotted part of said flange-slotted-threaded nuts; crossing a pre drilled hole; one on each ends of said supporting shaft to lock in place the described assembly of parts that engages hole 164.

Cover 159 mounts over 165 and 158 (as specified earlier of paragraph two to FIG. 2) so that the bottom part of cover 159, ends flush with the bottom extremity of 165 and 158. Both the left side extremity, and right side extremity of cover 159 aligned flush; and match perfectly with the left side extremity of 165, and the right side extremity of 158; and is indicated by two doted lines. Both the cover 159 and the snowmobile attachment part 182, to FIG. 2, are shown from a slight angle, to show their dimensional shape. However, 159 and 182 are align perfectly square, placed inline with 165 and 158 before mounting them together. Cover 159 is securely engaged with 165 and 158 via 183 to (FIG. 3), using four metal bolts (not shown), each said bolt is fitted with a lock washer and metal washers (washers not shown); then put into holes 183 (FIG. 3); and secured into threaded holes immediately under holes 183 (FIG. 3). And further indicated by arrows to FIG. 2, via top of 172 of pillow block bearing 165, and via top of 173 of pillow block berring 158; not forgetting the other two threaded holes at the opposite side of said arrows to 172 and 173.

A space between snowmobile attachment part 182 and drive shaft 162 is assured by the exact proportions of cover 159 and positioning of hole 164; taking into account pillow block berring 165 and pillow block bearing 158. A polyurethane spacer 171 is inserted over drive shaft 162 and positioned in between 158 and pillow blocks bearing 157. Said 157 helps support drive shaft 162. Using bolts, fitted with lock washers (not shown); 157 is fixed via hole indicated by an arrow via flange part 160, to metal plate 170; wherein said bolts fitted with washers engage threaded hole indicated by an arrow; that is one threaded hole facing the viewer to FIG. 2, and an other threaded hole at the back: opposite side not shown).

Snowmobile ski 176, and the ski base 163 are both made of material(s).

For a plastic snowmobile ski. Said metal plate 170 is fixed to snowmobile ski 176 using bolts; and preferably flat head key locking bolts (Bolts not shown) that enter the underside of ski base 163 of snowmobile ski 176, via pre drilled holes, crossing from side to side of snowmobile ski 176 and base part 163; wherein the bolts engage metal plate 170 via threaded holes (not shown) for receiving them from the underside of metal plate 170, said flat head key locking bolts. The head part of said flat head key locking bolts enter flush with the underside of base 163 of snowmobile ski 176; and finish flush inside of plate 170.

If the snowmobile ski is made of metal; then metal plate 170 can be welded with the snowmobile ski 176, along the seams between 170 and 176; or secured using Flat head Bolts, as explained with method for plastic ski.

Proceeding along drive shaft 162; between pillow block bearing 157 and a shaft support block 155 a polyurethane spacer 171, is inserted over drive shaft 162 proceeded by a shaft collar 156, that is in turn proceeded by a polyurethane spacer 171. Said shaft collar 156 (known to the art) is fixed to drive shaft 162, via a recessed set screw (not shown). Shaft collar 156, provides both polyurethane spacers 171; positioned left, and right, of 156 a tight flange fit, that is: between 157 and 156. And between 156 and 155. Shaft support block 155 is fixed to 170 in the same way as 157. Shaft support blocks are known to the art.

Drive Shaft 162 traverses Shaft support block 155, and exits 155, to engage with an external retaining ring 153 via a groove indicated by arrows (ring 153 is a preventive measure). A centimeter after said groove the drive shaft ends. The drive shaft 162 is interlocked with Shaft support block 155; since 162 and 155 are both partially keyed. Key 177 is inserted inside the keyway (showing a transparent view of key 177 inserted into 155); interlocking 155 and 162 together.

Therefore, put in simple terms; the Hydraulic double-vane rotary actuator 166, and the shaft support block 155 rotate with the ski 176; but not the cover 159, and therefore not the snowmobile attachment part 182.

Furthermore only the berrings 184 (FIG. 3), and 185 (FIG. 3), rotate inside the pillow blocks 165, and 158. But not their pillow blocks. 157 is an essential part and preventive measure by supporting the drive shaft 162, so it does not bend from the weight of the snowmobile and passengers aboard.

FIG. 3, bearings 184, of pillow block 165 to (FIG. 2) and bearings 185, of pillow block 158 to (FIG. 2) are both shown without the pillow blocks; to hopefully give the viewer a clear understanding; about the movements of the drive shaft 162, in relation to the bearings 184, and 185, that turn in accordance to the drive shaft 162. And since the pillow blocks part of 165, and 158, don't move; but instead remain stable with the cover 159 and 159 to (FIG. 2), that holds, supports a snowmobile via the snowmobile attachment part 182 (FIG. 2); that is positioned above and between 184, and 185. This way the snowmobile ski 176 (FIG. 2)

(see Diagram top right to (FIG. 2); is enabled to pivot from side to side from the axis 179 (FIG. 2) (see target sign), synchronously with the drive shaft 162. For example: 15 degrees to the right of the axis, or 15 degrees to the left of the axis.

The Hydraulic double-vane rotary actuator 166 turns the drive shaft 162 in relation to the hydraulic oil pressure entering, said 166. That is, via port hole 191 (FIG. 2), and exiting via port hole 192 (FIG. 2); or the reverse: entering 192 (FIG. 2), and exiting 191 (FIG. 2). Hither way determines the direction the drive shaft 162 turns: clockwise or counterclockwise. This next step is determined by the hydraulic power steering system of a snowmobile, powered by the snowmobile engine.

Using hydraulic grade hose lines and hydraulic grade fittings that connect to port hole 191 (FIG. 2) and port hole 192 (FIG. 2); of the Hydraulic double-vane rotary actuator 166 (FIG. 2) of each apparatus to (FIG. 2) mounted on each of a pair of snowmobile skis of the present invention. And first connecting each ends of hydraulic lines coming from each port 191 (FIG. 2); connecting them to a hydraulic (T) adapter fittings. Then adding a hydraulic line to the remaining adapter end of said (T) fitting; and connecting the opposite end of said hydraulic line (having a adapter fitting to connect with) to the right side valve connecting port of the hydraulic oil double-vane rotary pump of a snowmobile. Then connecting each port holes 192 (FIG. 2) with the methods used for (connecting) port holes 191; but instead connecting the ports 192 (FIG. 2) with the left side valve connecting port of said pump.

Now that all is connected to a snowmobile; the direction that the snowmobile steering column is turning (is turned) determines the valve (said right valve or left valve) on said pump that will be sending hydraulic oil pressure accordingly to the designated port hole 191 (FIG. 2), or 192 (FIG. 2) of the Hydraulic double-vane rotary actuator 166. As mentioned earlier, the direction the steeling column is turned; this will determine the direction the drive shaft 162 (FIG. 2) pivots; clockwise or counterclockwise. This way the pair of skis 176 (FIG. 2) will also pivot accordingly, and in synchronization with the drive shaft 162 (FIG. 2) of each apparatus (FIG. 2) mounted on each of the skis 176 (FIG. 2).

The traction produced by each mounted apparatus to (FIG. 2), on each of a pair of snowmobile skis is explained:

As with all snowmobile skis, it is when tuning a curve that the traction is most needed; but is also the critical point, determining if the traction of the skis is good or bad.

Therefore, below describes a pair of snowmobile skis each mounted with the apparatus of the present invention in a turning situation.

The gravitational force exerted on each ski increases closer to the inbounds of the curved trajectory line as the skis tilt in accordance with a curved trajectory line; increasing traction of the pair of skis on snow (see diagram top right to (FIG. 2).

Traction on ice is explained.

The edge part of ski 176; shown where the arrow ends base part 163 (FIG. 2). See also Diagram top right (FIG. 2); that shows the edges to both sides of ski; 180 (FIG. 2) and 181 (FIG. 2). When the snowmobile skis are turning the edges of the skis are parallel to a curves trajectory line (cutting into the ice) that in turn increases traction of the skis; and the effect is furthermore amplified by the mass weight of the snowmobile that is shifted into the curve and exerted on the edge of the pair of skis has they are cornering on ice surfaces.

In an other aspect of the traction apparatus for snowmobile skis of the present invention.

The traction apparatus for snowmobile skis, can and may connect and operate with; an electro-hydraulic steering system; by connecting with the ports of solenoid valves of an electro-hydraulic rotary pump, with the hydraulic oil lines that are connected with 191 (FIG. 2) and 192 (FIG. 2) of 166 (FIG. 2).

Furthermore. The traction apparatus for snowmobile skis, can and may connect to operate with; an Electric power steering system. Wherein the Hydraulic double-vane rotary actuator 166 to (FIG. 2), is instead replaced by an Electric motor (not shown). This is done by aligning the electric motors drive shaft, with the drive shaft 162 (FIG. 2) and connecting them together using a keyed shaft coupling (not shown, and known to the art). But before fixing the said shaft coupling; adding polyurethane spacers 171 to (FIG. 2); one on each sides of the said keyed shaft coupling; followed by shaft collars similar to 156 to (FIG. 2), again one for each sides. This arrangement will protect parts from impact. Then connecting the electric motors wires to the said Electric Power steering system using wire cable.

NOTES to FIG. 2, and to FIG. 3:

The snowmobile ski 176 to (FIG. 2), wherein the pair of skis are made of plastic; can and may have metal blade edges (not shown), 180 (FIG. 2) and 181 (FIG. 2) along the sides of each skis; similar to blade edges on alpine skis.

Metal parts comprising: square pillow block part of 165 (FIG. 2), square pillow block part of 158 (FIG. 2), pillow block part of 157 (FIG. 2), the Shaft support block 155 (FIG. 2), the cover 159 (FIG. 2), and 159 to (FIG. 3); can and may preferably be made of aluminum to provide strength and light weight; and preferably each having a corrosion resistant zinc coating.

Pillow block bearing 157 (FIG. 2) can, and may be replaced by a Shaft support block, similar to 155 (FIG. 2).

Said polyurethane spacers are preferred over rubber for their abrasive resistance and support impacts from other parts even under low temperatures.

Said metal drive shaft 162 (FIG. 2), can and may preferably made of hard 1117 steel (known to the art), that is corrosion resistant to face the environment; and to resist the compounded weight of the snowmobile and passengers, and when applying the brakes, and for resisting to impacts, for example: when hitting bumps.

What is claimed is:

1. A System for producing traction on snow and ice covered surfaces for use with skis; said system comprising:
    each of a pair of traction apparatus, are adapted to each of a pair of snowmobile skis; each apparatus consisting of an hydraulic double-vane rotary actuator, that engages with a drive shaft that enters pillow block bearings held together by a cover that engages a snowmobile connecting member;
    said drive shaft exits and enters a third pillow block bearing fix to a snowmobile ski, and ends engaged in a drive shaft support block;
    said third pillow block bearing with the drive shaft support block are both fixed to the said snowmobile ski;
    a hydraulic power steering system of a snowmobile controls each traction apparatus by supplying hydraulic oil pressure to each double-vane rotary actuator of each traction apparatus;
    the said hydraulic double-vane rotary actuator pivots; each drive shaft, with each apparatus mounted to each of a pair of snowmobile skis; together all move simultaneously clockwise or counterclockwise.

2. The snowmobile ski traction apparatus to claim 1, wherein said traction apparatus is powered and controlled by an electro-hydraulic power steering system.

3. The snowmobile ski traction apparatus to claim 1, wherein said traction apparatus is adapted with an electric motor, instead of said hydraulic double-vane rotary actuator, said electric motor is linked by wire cable and is powered and controlled, by an electric power steering system of a snowmobile.

4. The snowmobile ski to claim 1, wherein said snowmobile ski is made of at least one of; metal and, plastic.

5. The snowmobile ski to claim 4, wherein said snowmobile ski is made of plastic having metal edges along a lateral length of said snowmobile ski.

* * * * *